May 10, 1960     J. G. HODEK     2,935,892
CONTROL MEANS FOR VEHICLE
Filed March 2, 1959     2 Sheets-Sheet 1
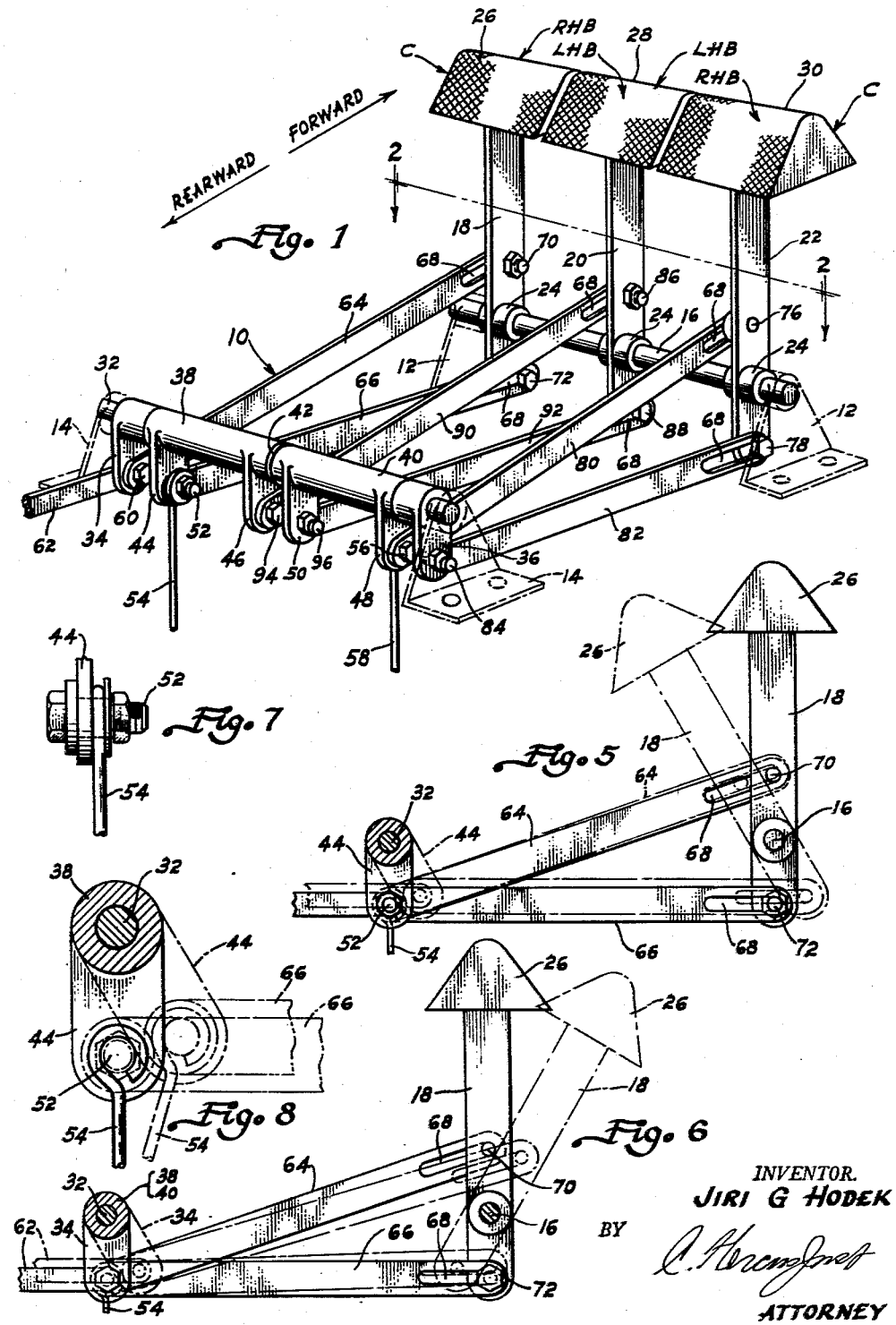
INVENTOR.
JIRI G HODEK
BY
ATTORNEY

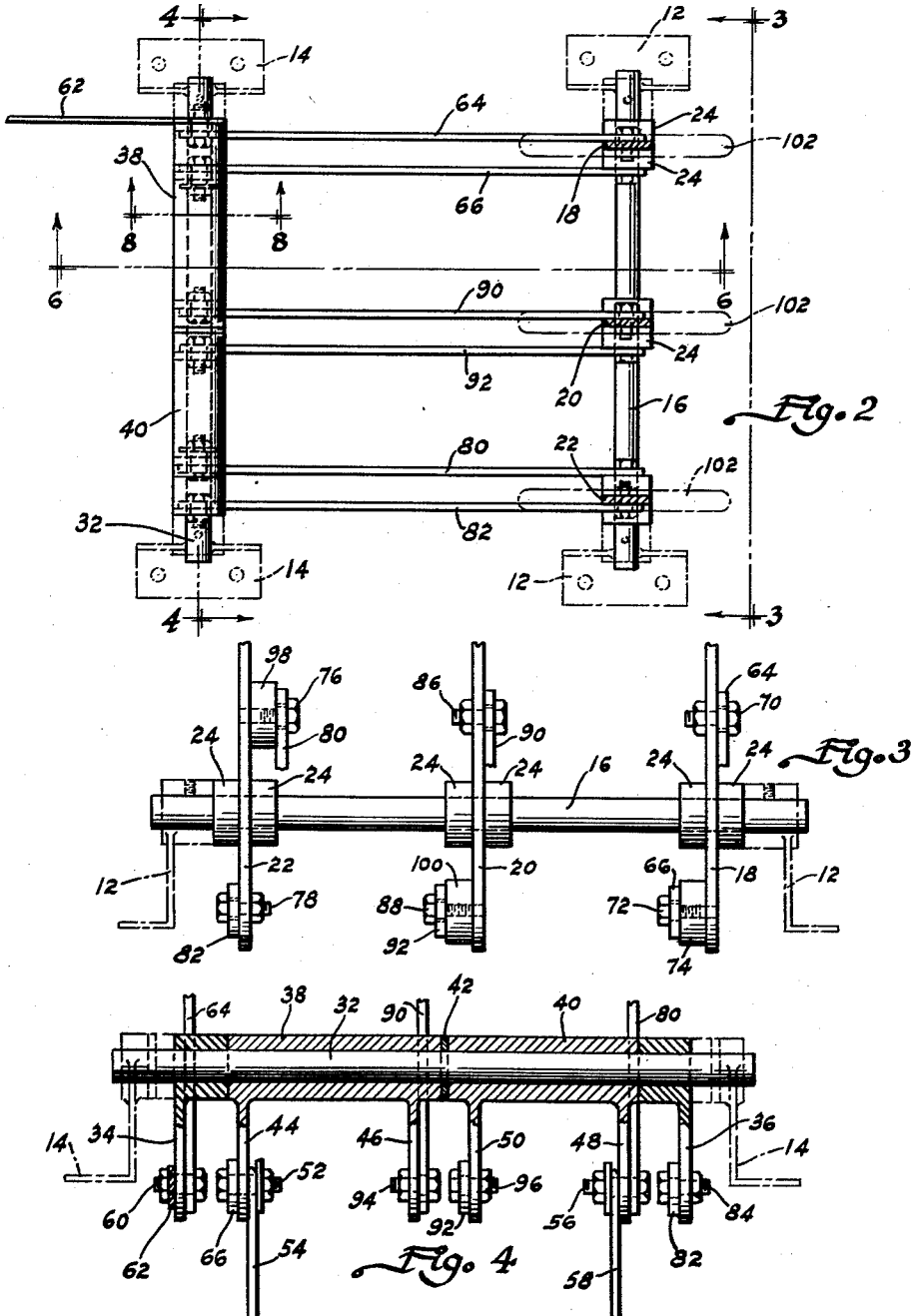

United States Patent Office 2,935,892
Patented May 10, 1960

2,935,892

CONTROL MEANS FOR VEHICLE

Jiri G. Hodek, New Holland, Pa., assignor to Sperry Rand Corporation, New Holland, Pa., a corporation of Delaware Application March 2, 1959, Serial No. 796,500

11 Claims. (Cl. 74—480)

This invention relates to control means for a vehicle and, more particularly, but without restriction thereto, to an agricultural tractor of the type employed to pull various kinds of agricultural implements extending rearwardly from the normal rearward end of the tractor, or to support and move through a field various other kinds of agricultural implements which have their forward end extending outward from the normal rearward end of such tractor, under which latter conditions the tractor is driven rearwardly to the normal concept of operation of tractors but forwardly relative to the implement. Hence, the present invention pertains particularly to vehicles which are intended to be driven selectively in either direction longitudinally of the axis of the vehicle, such as rearwardly or forwardly.

Certain vehicles and particularly agricultural tractors of the type referred to above such as are manufactured to be driven selectively and with equal facility, either forwardly or rearwardly, and to adapt the same most suitably to any one of a number of different types of agricultural implements. It is common practice to provide a seat for the operator adjacent the steering wheel of the implement, said seat being movable selectively to one of a plurality of positions respectively permitting the operator to face forwardly toward the normal front or guiding wheels of the vehicle, such as a tractor, or rearwardly therefrom, depending upon the direction in which it is desired to move the tractor to operate a particular agricultural implement in its customary manner when either pulled in trailing fashion behind a tractor or having the normally forward end of the implement extending rearwardly from the main, large driving wheels of the tractor, under which latter conditions the tractor is driven in the direction that the small guiding wheels will trail the large driving wheels of the tractor, and the seat for the operator will be positioned accordingly so that he can face conveniently in the direction in which the tractor is moving.

Modern vehicles such as agricultural tractors, and particularly those of heavy duty type capable of supporting and moving large implements through a field such as a double row corn harvester, hay baler, or the like, normally are provided with control means comprising three operating levers which respectively actuate a clutch, a brake for the left hand driving wheel, and a brake for the right hand driving wheel. These control means usually are in the form of pivoted levers having foot pedals on the upper ends thereof. These pedals usually are arranged in a straight row extending parallel to the axles for the normal rear or large driving wheels of the tractor vehicle, for example, and are positioned adjacent the seat for the operator and at a convenient distance forwardly from the seat, regardless of which location the seat is mounted in, so that the operator may place his feet upon the pedals and push them forwardly relative to his position in the seat to operate selectively the clutch, left-hand wheel brake or right-hand wheel brake. The left and right hand wheel brakes conventionally are operable independently of each other particularly to facilitate turning movements of the tractor vehicle, and thereby also aid in steering the same during such turning movements.

It is quite a simple matter to connect a row of levers having pedals on the upper ends thereof respectively with a clutch, left-hand wheel brake and right-hand wheel brake, particularly if the tractor is moved normally in a conventional forward direction for example as is the situation in many conventional type tractors now in use. However, in regard to more modern tractors of the type referred to hereinabove, wherein it is desired to change the position of the seat of the driver so as to face either toward the small forward steering wheels, or away therefrom it will be seen that when the seat of the operator is changed to face away from the forward small steering wheels, for purposes of driving the tractor more or less steadily in a direction which would be regarded as rearward to the conventional forward direction of the tractor, and assuming that the seat for the operator is arranged relative to the control pedals so that the operator will still push forwardly from his feet upon the pedals, the control connections to the clutch as well as the independently operated left-hand and right-hand brake actuating structure will have to be so arranged that relatively forward movements of the control pedals, when the driver is in either of the two possible positions referred to, will produce clutching and braking operations as desired.

Devices for this purpose which have heretofore been devised have been unsatisfactory not only from the standpoint of being complex but they also have been of the type wherein one pedal constitutes the clutch pedal, regardless of which way it is pushed, and the other two pedals respectively actuate the left-hand wheel brake and the right-hand wheel brake, regardless of the direction in which they are pushed. Thus, it will be seen that when an operator is driving the tractor with the seat positioned to enable him to face forwardly toward the small steering wheels, the row of pedals will be arranged in a specific pattern from left to right, for example, whereas when the seat for the operator is reversed, said row of pedals will extend oppositely from left to right so that, in order to operate the pedals from one of said positions or the other, the operator will have to make a mental transformation in regard to the particular direction in which he is driving the tractor for purposes of correctly operating the clutch and brake pedals to perform the desired functions thereof intended.

The principal object of the present invention is based upon the assumption that it would be far easier to provide control means of the type referred to for a tractor vehicle of the type having a row of control levers and pedals respectively arranged, for example, from left to right, to constitute the clutch, left-hand wheel brake, and right-hand wheel brake operating pedals, regardless of which direction the operator was facing while seated upon the tractor vehicle and no mental transformation has to take place. That is, regardless of whether the operator is facing forwardly or rearwardly relative to the front steering wheels of the tractor, the left-hand pedal, for example, will be the clutch, the intermediate pedal will be the left-hand brake pedal and the right-hand pedal will be the right-hand brake pedal. To this end, a relatively simple mechanical system has been devised and is provided to achieve the above described objective and perform operations of the clutch and both brakes of the vehicle when the pedals are pushed forwardly, for example, from the seat in which the operator is positioned, regardless of the position within which the seat is mounted respectively for forward or rearward driving of the tractor vehicle.

Another object of the invention is to provide relatively simple, positive and lost-motion connecting means between the clutch and two brake levers and the clutch and two brake rod operating means comprising part of the present invention, thereby affording simple means for translating the clutching and braking operations from opposite directions of movement of the upper ends of the levers which have the foot pedals thereon for operation from opposite sides.

Another object of the present invention is to provide simple clutch operating means which are connected commonly to the outermost levers and which means are operable by said levers respectively when one lever is moved in one direction and the other lever is moved in the opposite direction so that, for example, the left-hand lever when pushed forwardly from the operator's seat will always actuate the clutch, regardless of which of the two opposite positions the seat for the operator is disposed in any time. Further, the clutch operating means conveniently and preferably comprises a shaft which oscillatably supports a pair of sleeves respectively comprising operating means for the two brake rods and said sleeves respectively also are interconnected to the outermost control levers in such manner that when, for example, the right-hand lever is pushed forwardly relative to the seat of the driver, the right-hand brake will be applied, regardless of which of the two positions the seat is mounted in. Still further, the intermediate lever is interconnected to both of the brake operating sleeves but in such manner that when the lever is moved forwardly relative to the seat of the operator, it will always apply the left-hand brake, regardless of which of the two positions the seat is mounted in, thus resulting in one sleeve being actuated to apply the left brake when the seat is in one position and the other sleeve being actuated to apply the left brake when the seat is in the opposite position.

A still further object is to provide not only simple but rugged mechanism consuming relatively small space, but which also is fool-proof in operation and capable of long life.

Details of the foregoing objects and of the invention, as well as other objects thereof, are set forth in the following specification and illustrated in the accompanying drawings comprising a part thereof.

In the drawings:

Fig. 1 is a perspective view of the control mechanism for operating selectively the clutch and the left-hand and right-hand brakes of a vehicle (not illustrated) in accordance with the principles of the present invention, said control mechanism being supported by a plurality of brackets, illustrated in phantom, which are connected to suitable supporting means upon a conventional tractor vehicle.

Fig. 2 is a top plan view of the control mechanism illustrated in Fig. 1, part of said view being in horizontal section taken on the line 2—2 of Fig. 1.

Fig. 3 is an end elevation as seen from the line 3—3 of Fig. 2 and showing the control mechanism as seen from the actuating lever end thereof, the upper ends of the actuating levers being broken away to simplify the illustration of the mechanism.

Fig. 4 is a vertical sectional view taken on the line 4—4 of Fig. 2 with certain upper portions of the control mechanism being broken away to simplify the illustration.

Fig. 5 is a side elevation showing a single control lever and the mechanism actuated thereby illustrated in full lines when the lever is in neutral position, while in phantom lines, the lever and relative positions of the elements moved thereby are shown as when the lever is moved in one direction relative to its pivot, this view generally being on line 6—6 of Fig. 2.

Fig. 6 is a view similar to Fig. 5 but illustrating in full lines the position of the lever and elements moved thereby, and in phantom, the position of the elements when said lever is moved in the opposite direction to that shown in Fig. 5 relative to its pivot, as seen from the line 6—6 of Fig. 2.

Fig. 7 is a vertical, fragmentary detail showing on an enlarged scale the preferred means for connecting the upper end of one of the brake rods to the actuating means therefor as illustrated thereabove in Fig. 1.

Fig. 8 is a fragmentary side elevation, as seen on the line 8—8 of Fig. 2, showing in full lines the neutral or idle position of one of the brake actuating means, while in phantom lines, the relative positions of the operating means and brake rod are shown when the actuating lever has been moved to effect braking movement of the brake rod.

The present invention is best illustrated in an overall manner in Fig. 1, wherein all essential elements of the preferred construction of the control means comprising the invention are shown in perspective manner. It will be understood that the control unit 10 which is illustrated in Fig. 1 in full lines is supported by pairs of brackets 12 and 14, illustrated in phantom, which are fixed to and supported by the frame of a tractor vehicle, for example (not shown), adjacent a seat for the operator which also is not illustrated but which it will be understood is positionable in either of two positions respectively either forwardly or rearwardly of the brackets 12 as considered relative to the longitudinal axis of the tractor for purposes of ready reference. Extending between the pair of brackets 12 is a rigid shaft 16, the opposite ends of which are fixed respectively to the pair of brackets 12. This shaft extends transversely to the longitudinal axis of the tractor vehicle for example and comprises a common axis upon which a series of three operating levers 18, 20 and 22 are mounted in a row and are pivoted upon said shaft intermediately of the ends of said levers. Said levers also are spaced longitudinally along the shaft 16 and are held in such positions by suitable means such as locking collars 24 which are fixed to shaft 16. Fixed to the normally upper ends of the levers 18, 20 and 22 respectively are foot pedals 26, 28 and 30 which preferably are somewhat triangular in cross-section and are formed with tread surfaces on the oppositely inclined portions thereof, whereby said pedals readily may be engaged by the foot of the operator from either side of said pedals.

Oscillatably supported by bearings in the upper ends of the pair of brackets 14 is a clutch shaft 32. The shaft 32 extends between the brackets 14. Mounted upon the shaft 32 respectively adjacent the brackets 14 are a pair of radial ears 34 and 36 having collars on the upper ends thereof which receive shaft 32 and are fixed by any suitable means such as transverse pins, not shown, so as to be oscillatable in unison with shaft 32. The radial ears 34 and 36 preferably extend similarly downward.

Brake operating means comprising a pair of elongated sleeves 38 and 40 are oscillatably mounted upon clutch shaft 32 in longitudinal alignment between the collars of the radial ears 34 and 36 and, preferably, the inner ends of the sleeves 38 and 40 are separated by an anti-friction washer 42 which may be made from any suitable material such as an appropriate synthetic resin. The sleeve 38 has a first actuating ear 44 fixed to and depending therefrom adjacent the outer end, while a second actuating ear 46 is fixed to and depends therefrom adjacent the inner end of the sleeve 38. The sleeve 40 has a first actuating ear 48 fixed to and depending therefrom adjacent the outer end thereof, and said sleeve also has a second actuating ear 50 fixed to and depending therefrom adjacent the inner end of sleeve 40.

Any suitable pin means such as a bolt 52 extends through the lower end of first actuating ear 44 and also through a loop formed in the upper end of first brake rod 54. Additional pin means such as bolt 56 extends through the lower end of first actuating ear 48 and also through a loop formed in the upper end of second brake rod 58. Further, pin means such as a bolt 60 extends through the lower end of radial ear 34 and also through one end of a clutch-actuating rod 62 which is movable in one longitudinal direction to disengage the clutch (not shown) when the shaft 32 is oscillated in the corresponding direction to so move the rod 62 by means now to be described.

Interconnected between the operating levers 18, 20 and 22 and the clutch shaft 32, as well as the brake operating sleeves 38 and 40, are a plurality of positive and lost-motion connecting means respectively comprising pairs of links, the links of each pair respectively being designated upper and lower links. Such designation follows from the relative positions of the slotted ends of said levers which are connected to the operating levers as is best shown in Figs. 1, 5 and 6. Considering these links in detail, it will be seen that upper link 64 and lower link 66 comprise one pair of links and one end of each of said links is provided with a slot 68. The outer operating lever 18 is provided with a plurality of pin means comprising bolts 70 and 72 which respectively are positioned substantially equal distances above and below shaft 16, the bolts 70 extending through the slot 68 of upper link 64 and the bolt 72 extending through the slot 68 of the lower link 66.

The opposite end of upper link 64 is apertured to receive bolt 60 so as to pivotally connect said other end of upper link 64 to the radial ear 34 which is fixed to clutch shaft 32. Correspondingly, the other end of lower link 66 is apertured to receive bolt 52 which extends through first actuating ear 44 which is pivotally connected to first brake rod 54. In order to provide proper clearance between and also parallelism for the links 64 and 66 in plan view as shown in Fig. 2, a spacing collar 74 is placed upon bolt 72 between lower link 66 and operating lever 18 as seen in Fig. 3. The bolts 70 and 72 are slidable respectively within the slots 68 of links 64 and 66 when the operating lever 18 is moved in opposite pivotal directions for purposes to be described hereinafter.

The opposite outer operating lever 22 is provided with a pair of pin means comprising bolts 76 and 78 which are secured to said lever in positions corresponding to the bolts 70 and 72 in operating lever 18. An upper link 80 and a lower link 82 of a second pair of links each have slots 68 in one end thereof, said slots respectively accommodating the bolts 76 and 78 for slidable movement within the slots when the lever 22 is moved in opposite pivotal directions. The opposite end of lower link 82 is apertured and a bolt 84 extends therethrough and also through a corresponding aperture in the lower end of radial ear 36 which depends from and is fixed to clutch shaft 32. The opposite end of upper link 80 is apertured to receive bolt 56 so as to interconnect link 80 to first actuating ear 48 and the upper end of second brake rod 58.

The intermediate operating lever 20 is apertured to receive a pair of bolts 86 and 88 which respectively are mounted therein correspondingly to the bolts 70 and 72 in lever 18 and bolts 76 and 78 in lever 22. An upper link 90 and a lower link 92 of a third pair of links each are provided with slots 68 in one end respectively to slidably receive the bolts 86 and 88. The opposite end of upper link 90 is apertured to receive a bolt 94 which also extends through a corresponding aperture in the lower end of second actuating ear 46, while the opposite end of lower link 92 is apertured to receive a bolt 96, said bolt pivotally connecting the second actuating ear 50 and said other end of lower link 92.

In order that desired suitable spacing may be provided between the slotted end of upper link 80 and operating lever 22, a spacing collar 98 is mounted upon bolt 76 therebetween. Similarly, to provide for suitable desired spacing and positioning of lower link 92 and intermediate operating lever 20, another spacing collar 100 is positioned upon bolt 88 between lever 20 and the slotted end of the lower link 92 as can be observed from Fig. 3.

*Operation of control unit*

In the preferred construction of the control unit, it preferably will be mounted, in the main, beneath a suitable floor deck, not illustrated, which will be provided with parallel slots 102 shown in exemplary manner, in phantom, in Fig. 2. The upper portions of the operating levers 18, 20 and 22 respectively extend through the slots 102, whereby the various shafts and links will be below the floor deck. It will be assumed that the seat for the operator is positioned upon the floor deck or otherwise rearwardly of the brackets 12, whereby it is intended that the vehicle shall be driven forwardly as indicated by the exemplary arrow bearing the Forward legend in Fig. 1. Under such circumstances, it will be assumed that the foot pedals 26, 28 and 30 are to be pushed forwardly when desired, respectively to operate the clutch, left-hand brake, and right-hand brake, as indicated by appropriate arrows and lettered legends in Fig 1, the arrows extending generally in the direction of the Forward arrow and this is the direction in which said pedals will be moved to perform the desired operations. In the event the clutch pedal 26 is moved forwardly, the bolt 70 will engage the forward end of slot 68 in upper link 64 and thereby move the lower end of radial ear 34 forwardly, also moving the clutch-actuating rod 62 therewith to effect operation of the clutch.

Correspondingly, if the intermediate pedal 28 is moved forwardly in the direction of the corresponding arrow to actuate the left-hand brake (LHB) of the tractor vehicle, the bolt 86 will engage the outer end of slot 68 in upper link 90, thereby moving second actuating ear 46 forwardly, as well as first actuating ear 44 in the same direction, thereby moving first brake rod 54 upwardly in a direction to apply what will be the left-hand brake relative to the direction of movement of the tractor vehicle as indicated by the Forward arrow shown in Fig. 1.

The foot pedal 30 will operate the right-hand brake (RHB) when moved forwardly as indicated by the arrow and the legend for said brake, thereby causing the bolt 76 to engage the outer end of slot 68 of upper link 80 to effect forward movement of first actuating ear 48 and vertical movement of second brake rod 58 which now will apply the right-hand brake, the same being considered relative to the direction of movement of the tractor vehicle.

In all of the operations described hereinabove, when the lever 18 is moved forwardly, the bolt 72 will move idly in slot 68 of lower link 66. Correspondingly, relative to the intermediate and opposite outer operating levers 20 and 22, the bolts 88 and 78 respectively thereon will move idly within the slots 68 of the lower links 92 and 82 respectively, thus causing no interference with the operating actions of the upper links respectively connected to each of the operating levers 18, 20 and 22.

It is to be noted particularly that a predetermined arrangement of pedals from left to right, relative to Fig. 1, has arbitrarily been selected whereby the left-hand pedal 26 operates the clutch, the intermediate pedal 28 operates the left-hand brake and the right-hand pedal 30 operates the right-hand brake, all considered relative to the operator and his position in which he faces which, in the example described above, is forwardly as indicated by the arrow legend in Fig. 1. Such arrangement is exemplary and arbitrary for purposes of this description.

Assuming now that the seat for the operator is positioned forwardly of the brackets 12 so that the operator may move the tractor vehicle in what would normally be regarded as a rearward direction as indicated by the legend Rearward and arrow in Fig. 1, but which direction will actually be forward as far as the implement which is mounted upon the tractor vehicle may be concerned, such as in situations where a corn harvester, hay baler, and the like are mounted upon the tractor in accordance with conventional practice. Under these circumstances, and in regard to the established pattern of the arrangement of the pedals at the upper end of the operating lever, and particularly so that the operator will not have to make any mental calculations or rearrangements in operating said pedals, the pedal 30 will now operate the clutch and will be at the extreme left-hand position relative to the operator who is now facing rearwardly, as indicated by the arrow and the symbol C for the clutch shown in Fig. 1 relative to pedal 30. When the pedal 30 now is moved in the direction of the arrow C the bolt 76 will slide idly in slot 68 of upper link 80, while the bolt 78 will engage the outer end of slot 68 in lower link 82, thereby moving radial ear 36 correspondingly to cause oscillation of clutch shaft 32 so as to cause radial ear 34 to move toward the brackets 12 and thus actuate the clutch-actuating rod 62 to de-clutch the transmission from the engine for example, of the tractor vehicle.

Under the circumstances immediately described above, the intermediate pedal 28, when moved by the operator rearwardly in the direction of arrow LHB, will operate the brake rod 58 by causing the bolt 86 to move idly within slot 68 of upper link 90, while the bolt 88 will engage the outer end of slot 68 of lower link 92, thereby causing movement of the lower end of second actuating ear 50 toward the brackets 12 and, due to the fact that the first actuating ear 48 is connected commonly with ear 50 to the brake operating sleeve 40, such movement of link 92 will effect upward and braking movement of second brake rod 58 which is connected to the brake which will now be regarded as the left-hand brake by the operator who is facing rearwardly in the tractor vehicle.

Still further, in regard to the second or reverse position of the operator referred to immediately above, the foot pedal 26 will now be at the extreme right-hand end of the row of pedals relative to the direction the operator is facing and, when he presses upon pedal 26 rearwardly to move the same in the direction of the arrow RHB to apply the right-hand brake, the bolt 70 will move idly within slot 68 of upper link 64, while the bolt 72 will engage the outer end of slot 68 in lower link 66, thereby moving the lower end of first actuating ear 44 toward the brackets 12, thereby causing elevating movement of the first brake rod 54 to effect braking action of what will now be regarded by the operator as the right-hand brake of the tractor vehicle.

From the foregoing, it will be seen that the control unit comprising the present invention provides a simple and effective means by which a row of foot pedals which are mounted upon a corresponding row of operating levers are readily engageable by the operator of a tractor vehicle when seated either facing forwardly or rearwardly of the vehicle, under which conditions the seat for the operator respectively is positioned either rearwardly or forwardly of the pedals of the operating levers, whereby to operate the levers and pedals from either of the two seating positions, it is only necessary for the operator to press forwardly from his seat to operate said pedals and levers. In either of the positions, the pedals are arranged in the same predetermined arrangement, such as clutch, left-hand brake, and right-hand brake, extending from the operator's left to right, whereby no mental transformation or rearrangement has to be performed by the operator in regard to operating the pedals of the operating levers when changing from one position of seating to the opposite position thereof. Further, whereas when the operator is facing in one direction, the left-hand brake will be toward his left side and the right-hand brake will be toward his right side, when he changes his seating direction, the brake then adjacent his left side will be the left-hand brake and the brake adjacent his right side will still be the right-hand brake relative to his seating position. Thus, there is no confusion or possibility of accidental operation of the operating levers. Further, the individual components of the control unit are relatively few in number, are easily and inexpensively manufactured and assembled, and the overall arrangement is durable and capable of long and continuous use.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A control system for a two-way drive vehicle having a clutch and two wheels at opposite sides respectively having independently operable brakes each having a brake rod to actuate the brake when moved in one direction, said system comprising a row series of three operating levers pivotally supported intermediately of the ends about a substantially common axis, said levers being movable in opposite directions, whereby an operator may selectively be positioned on opposite sides of the pivotal axis of the levers respectively to drive the vehicle in either of two opposite directions, clutch operating means, two brake operating means respectively connected to said brake rods, positive and lost-motion means respectively interconnecting each of the outermost levers to said clutch operating means for actuation of the clutch means respectively when one lever is moved in one pivotal direction and the other is moved in the opposite pivotal direction, additional positive and lost-motion means also connecting said outermost levers respectively to said two brake operating means for separate actuation of said brake rods when said outermost levers are moved oppositely to the clutch actuation directions thereof, and a plurality of positive and lost-motion means respectively interconnecting said intermediate operating lever respectively to said two brake operating means to operate said brake operating means respectively in braking operation when said lever is moved in opposite directions, said positive and lost-motion connections being arranged so that when the operator is positioned at one side of the pivotal axis the levers operate in the same alignment from left to right to actuate the clutch and left and right hand brakes in relation to the position of the operator as when the operator is positioned at the opposite side of the pivotal axis of said levers.

2. A control system for a two-way drive vehicle having a clutch and two wheels at opposite sides respectively having independently operable brakes each having a brake rod to actuate the brake when moved in one direction, said system comprising a row series of three operating levers pivotally supported intermediately of the ends about a substantially common axis, said levers being movable in opposite directions, whereby an operator may selectively be positioned on opposite sides of the pivotal axis of the levers respectively to drive the vehicle in either of two opposite directions, clutch operating means comprising a shaft supported for oscillation about its axis, radial ears extending therefrom and fixed thereto at longitudinally spaced positions, two brake operating means respectively connected to said brake rods, positive and lost-motion means respectively interconnecting each of the outermost levers to the radial ears of said clutch operating shaft for actuation of the clutch means respectively when one lever is moved in one pivotal direction and the other is moved in the opposite pivotal direction, additional positive and lost-motion means also connecting said outermost levers respectively to said two brake operating means for separate actuation of said brake rods when said outermost levers are moved oppositely to the clutch actuation directions thereof, and a plurality of positive and lost-motion means respectively interconnecting said intermediate operating lever respectively to said two brake operating means to operate said brake operating means respectively in braking operation when said lever is moved in opposite directions, said positive and lost-motion connections being arranged so that when the operator is positioned at one side of the pivotal axis the levers operate in the same alignment from left to right to actuate the clutch and left and right hand brakes in relation to the position of the operator as when the operator is positioned at the opposite side of the pivotal axis of said levers.

3. A control system for a two-way drive vehicle having a clutch and two wheels at opposite sides respectively having independently operable brakes each having a brake rod to actuate the brake when moved in one direction, said system comprising a row series of three operating levers pivotally supported intermediately of the ends about a substantially common axis, said levers being movable in opposite directions, whereby an operator may selectively be positioned on opposite sides of the pivotal axis of the levers respectively to drive the vehicle in either of two opposite directions, clutch operating means, two brake operating means comprising elongated members supported in axial alignment for oscillation about the axis thereof and respectively connected to said brake rods, positive and lost-motion means respectively interconnecting each of the outermost levers to said clutch operating means for actuation of the clutch means respectively when one lever is moved in one pivotal direction and the other is moved in the opposite pivotal direction, additional positive and lost-motion means also connecting said outermost levers respectively to said two brake operating members for separate actuation of said brake rods when said outermost levers are moved oppositely to the clutch actuation directions thereof, and a plurality of positive and lost-motion means respectively interconnecting said intermediate operating lever respectively to said two brake operating members to operate said brake operating means respectively in braking operation when said lever is moved in opposite directions, said positive and lost-motion connections being arranged so that when the operator is positioned at one side of the pivotal axis the levers operate in the same alignment from left to right to actuate the clutch and left and right hand brakes in relation to the position of the operator as when the operator is positioned at the opposite side of the pivotal axis of said levers.

4. A control system for a two-way drive vehicle having a clutch and two wheels at opposite sides respectively having independently operable brakes each having a brake rod to actuate the brake when moved in one direction, said system comprising a series of three operating levers supported intermediately of the ends thereof about a substantially common axis, a clutch shaft mounted in transversely spaced parallelism with said axis of said levers and supported for oscillation about its axis, radial ears fixed to and extending in similar directions from said clutch shaft at longitudinally spaced positions, a clutch operating lever pivotally connected to the outer end of one of said ears and arranged when moved in one longitudinal direction to actuate the vehicle clutch, a pair of brake operating sleeves supported in longitudinal alignment upon said clutch shaft between the ends thereof, positive and lost-motion means respectively connecting the outermost levers to the radial ears on the ends of the clutch shaft for actuation of the clutch means respectively when one lever is moved in one pivotal direction and the other is moved in the opposite pivotal direction, additional positive and lost-motion means also connecting said outermost levers respectively to said brake operating sleeves for separate actuation of said brake rods when said outermost levers are moved oppositely to the clutch actuation directions thereof, and a plurality of positive and lost-motion means respectively connecting said intermediate lever to said pair of brake operating sleeves to operate the same in braking operation when said intermediate lever is moved in opposite directions, said positive and lost-motion connections being arranged so that when an operator is at one side of the pivotal axis of said levers said levers will operate in the same order of alignment from left to right relative to his position at said one side of the said axis as at the other, thereby requiring no mental operation in actuating the clutch or either brake from either side of the pivotal axis of said levers.

5. A control system for a two-way drive vehicle having a clutch and two wheels at opposite sides respectively having independently operable brakes each having a brake rod to actuate the brake when moved in one direction, said system comprising a series of three operating levers supported intermediately of the ends thereof about a common axis, a clutch shaft mounted in transversely spaced parallelism with said axis of said levers and supported for oscillation about its axis, radial ears fixed to and extending in similar directions from opposite ends of said clutch shaft, a clutch operating lever pivotally connected to the outer end of one of said ears and arranged when moved in one longitudinal direction to actuate the vehicle clutch, a pair of brake operating sleeves supported in longitudinal alignment upon said clutch shaft between the ends thereof and each having a pair of actuating ears extending radially therefrom in the same general direction, one ear of each sleeve being connected respectively to the two brake rods for independent actuation of the brakes when said rods are moved in one direction thereby, positive and lost-motion means connected between said levers and ears of said clutch shaft and sleeves, the outermost pedals being connected thereby to the clutch shaft and respectively to said brake operating sleeves, whereby when one outermost lever is pushed in one direction the clutch will be actuated and the other outermost lever when pushed in the same direction will operate one of said brake operating sleeves while when said levers are moved in the opposite directions they respectively operate the other brake sleeve and clutch, the intermediate lever being connected by said positive and lost-motion means to said brake operating sleeves for respective operation thereof when said lever is moved in opposite directions but said lever moving the opposite brake operating sleeve to that operated by the outermost levers when moved in the same direction as the intermediate lever, whereby an operator may actuate said levers in the same alignment from left to right relative to his position at one side of the axis of said levers or the other, thereby requiring no change of mental operation in actuating the clutch or either brake.

6. A control system for a two-way drive vehicle having a clutch and two wheels at opposite sides respectively having independently operable brakes each having a brake rod to actuate the brake when moved in one direction, said system comprising a row series of three operating levers pivotally supported intermediately of the ends about a substantially common axis, said levers being movable in opposite directions, whereby an operator may selectively be positioned on opposite sides of the pivotal axis of the levers respectively to drive the vehicle in either of two opposite directions, clutch operating means, two brake operating means respectively connected to said brake rods, positive and lost-motion means respectively interconnecting each of the outermost levers to said clutch operating means for actuation of the clutch means respectively when one lever is moved in one pivotal direction and the other is moved in the opposite pivotal direction, additional positive and lost-motion means also respectively connecting said outermost levers respectively to said two brake operating means for separate actuation of said brake rods when said outermost levers are moved oppositely to the clutch actuation directions thereof, and a plurality of positive and lost-motion means respectively interconnecting said intermediate operating lever respectively to said two brake operating means to operate said brake operating means respectively in braking operation when said lever is moved in opposite directions, said positive and lost-motion connections comprising a pair of links for each lever and having a slot in one end respectively receiving pins fixed to each lever at opposite sides of the pivot thereof, the opposite ends of said levers being connected to the operating means to be actuated respectively by said levers, whereby when the levers are moved in one direction one link will be actuated and the slot in the other link effects lost motion and vice versa, said links being arranged and so connected to the operating means that when the operator is positioned at one side of the pivotal axis the levers operate in the same alignment from left to right to actuate the clutch and left and right hand brakes in relation to the position of the operator as when the operator is positioned at the opposite side of the pivotal axis of said levers.

7. A control system for a two-way drive vehicle having a clutch and two wheels at opposite sides respectively having independently operable brakes each having a brake rod to actuate the brake when moved in one direction, said system comprising a series of three substantially vertical operating levers, fixed shaft means independently supporting said levers pivotally intermediately of the ends thereof in longitudinally spaced relationship along said shaft, a clutch shaft mounted in transversely spaced parallelism with said fixed shaft and supported for oscillation about its axis, radial ears fixed to and extending in similar directions from opposite ends of said clutch shaft, a clutch operating lever pivotally connected to the outer end of one of said ears and arranged when moved in one longitudinal direction to actuate the vehicle clutch, first and second sleeves supported in longitudinal alignment upon said clutch shaft between the ends thereof and each having first and second actuating ears extending radially downward therefrom in the same general direction, one ear of each sleeve being connected respectively to the two brake rods for independent actuation of the brakes when said rods are moved in one direction thereby, a pair of respectively upper and lower links for each lever and each link having a slot in one end, means on each lever located at opposite sides of the pivot thereof and slidably received respectively within the slots of each pair of levers, means pivotally connecting the opposite end of the upper link on one of the outermost levers to the radial ear on the corresponding end of the clutch shaft and the opposite end of the lower link on said lever to one of the actuating ears on the first sleeve, additional means pivotally connecting the opposite end of the upper link on the other outermost lever to one of the actuating ears on the second sleeve and the opposite end of the lower link on said other lever to the radial ear on the opposite end of the clutch lever, and further means pivotally connecting the other end of the upper link on the intermediate lever pivotally to the other actuating ear on the first sleeve and the other end of the lower lever on the intermediate lever pivotally to the other actuating ear on the second sleeve, whereby an operator may actuate said levers in the same alignment from left to right relative to his position at one side of the fixed shaft or the other, thereby requiring no change of mental operation in actuating the clutch or either brake.

8. A control system for a two-way drive vehicle having a clutch and wheels having brakes, said system comprising a pair of operating levers pivotally supported intermediately of the ends thereof about a substantially common axis, said levers being movable in opposite directions, whereby an operator may selectively be positioned on opposite sides of the pivotal axis of the levers respectively to drive the vehicle in either of two opposite directions, clutch operating means, brake operating means, positive and lost-motion means respectively interconnecting said levers to said clutch operating means for actuation of the clutch means respectively when one lever is moved in one pivotal direction and the other lever is moved in the opposite pivotal direction, and additional positive and lost-motion means also connecting said levers respectively to said brake operating means for actuation thereof in braking direction when said levers are moved oppositely to the clutch actuating directions thereof, whereby when the operator is positioned on one side of the pivotal axis of the levers the levers operate in the same alignment from left to right to actuate the clutch and brake in relation to the position of the operator as when the operator is positioned at the opposite side of the pivotal axis of said levers.

9. The control system set forth in claim 8 further characterized by said positive and lost-motion means comprising pairs of links respectively interconnected to said levers at one end and having a slot in said end, a pair of pins carried by each lever at opposite sides of the pivot thereof and respectively received in the slots in each pair of links, and means connecting the opposite ends of each pair of links respectively to said clutch and brake actuating means, whereby when the levers are moved in one direction one link will be positively actuated to move the actuating means to which it is connected and the slot in the other link effects lost-motion and vice versa.

10. The control system set forth in claim 9 further characterized by said clutch operating means comprising a shaft supported for oscillation about its axis parallelly to the pivotal axis of said levers, and radial ears extending therefrom and fixed thereto at longitudinally spaced positions, and means connecting the opposite end of one link of each pair thereof respectively to said ears.

11. The control system set forth in claim 10 further characterized by said brake operating means comprising sleeve means oscillatably supported by said clutch shaft and having ears extending radially therefrom, and means connecting the opposite end of the other link of each pair thereof respectively to said ears on said sleeve means.

References Cited in the file of this patent
UNITED STATES PATENTS 2,796,140     Knolle _____ June 18, 1957

FOREIGN PATENTS 1,102,790     France _____ May 11, 1955